United States Patent
Kim et al.

(10) Patent No.: US 7,638,059 B2
(45) Date of Patent: Dec. 29, 2009

(54) METHOD FOR STABLE OXYGEN ISOTOPE SEPARATION AND ITS APPARATUS USING MEMBRANE DISTILLATION

(75) Inventors: JaeWoo Kim, Daejeon (KR); Hwa-Rim Choi, Daejeon (KR); Dae-Shik Chang, Daejeon (KR); Yun-Young Choi, Kyungsangnam-do (KR)

(73) Assignee: Korea Atomic Energy Research Institute (KR)

( * ) Notice: Subject to any disclaimer, the term of this patent is extended or adjusted under 35 U.S.C. 154(b) by 491 days.

(21) Appl. No.: 11/701,839

(22) Filed: Feb. 2, 2007

(65) Prior Publication Data
US 2008/0185283 A1    Aug. 7, 2008

(51) Int. Cl.
*B01D 61/00* (2006.01)
*B01D 61/36* (2006.01)
*B01D 61/58* (2006.01)

(52) U.S. Cl. .............. 210/651; 210/640; 210/321.6; 202/200; 203/10; 62/624; 62/655

(58) Field of Classification Search ............... None
See application file for complete search history.

(56) References Cited

U.S. PATENT DOCUMENTS 3,340,186 A  * 9/1967  Weyl ........................ 210/651
3,562,116 A  * 2/1971  Rodgers .................... 202/200
4,545,862 A  * 10/1985 Gore et al. .................. 203/10
5,074,225 A  * 12/1991 Petrie .................... 110/101 R
5,084,181 A  * 1/1992  Van Hook et al. ........... 210/640
5,204,003 A  * 4/1993  Cochran, Jr. .............. 210/651
6,321,565 B1 * 11/2001 Kihara et al. ................ 62/643
6,716,355 B1 * 4/2004  Hanemaaijer et al. ....... 210/640

* cited by examiner

*Primary Examiner*—Krishnan S Menon
(74) *Attorney, Agent, or Firm*—McDermott Will & Emery LLP

(57) ABSTRACT

The present invention relates to an oxygen isotope separation system and a method therefor. More specifically, the invention relates to a newly invented pressure-driven AGMD (Air Gap Membrane Distillation) system applied to a multi-stage membrane distillation cells which can produce an oxygen isotope effectively and economically, and a method therefor. The invention provides an oxygen isotope separation system including a number of Air Gap Membrane Distillation (AGMD) permeation cells connected in series to separate a feed into a product and a tail, wherein each of the AGMD cell is connected at a tail outlet with a reflux pump and at a product outlet, whereby the product from (i−1)th cell and the tail from (i+1)th cell are pumped as the feed into ith cell.

7 Claims, 8 Drawing Sheets

METHOD FOR STABLE OXYGEN ISOTOPE SEPARATION AND ITS APPARATUS USING MEMBRANE DISTILLATION

BACKGROUND OF THE INVENTION

1. Field of the Invention

The present invention relates to an oxygen isotope separation system and a method therefor. More specifically, the invention relates to a newly invented pressure-driven AGMD (Air Gap Membrane Distillation) system applied to a multi-stage membrane distillation cells which can produce an oxygen isotope effectively and economically, and a method therefor.

2. Description of the Related Art $^{18}$O-enriched water (>90%) is used as a target in the cyclotron for the production of the β-emitting radioisotope $^{18}$F (half-life=109.7 min), which is essential for PET (Positron Emission Tomography) pharmaceutical [$^{18}$F]-labeled 2-deoxyglucose (FDG) synthesis. Demand for O-18 stable isotope increases as the superior tumor diagnostic feasibility obtained from PET increases. Economic mass production of the stable oxygen isotope, hence, is important and necessary.

As the separation methods of the oxygen isotopes (99.86% for O-16, 0.04% for O-17, and 0.2% for O-18 in nature), thermal diffusion, electrolysis, chemical exchange, gas diffusion, laser isotope separation, fractional distillation, cold distillation, and membrane distillation have been developed. However, fractional distillation of water is mainly used in the current production system while membrane distillation has been investigated to increase its applicability to the real production system since early 1990's due to its high separation factors compared to the other processes.

Distillation, which uses the different boiling point (same as the equilibrium vapor pressure) of the given materials, is known as the most effective process for separation of the light isotopes such as hydrogen, carbon, and oxygen, etc. Membrane distillation uses the equilibrium vapor pressure of the materials as well as their differentiated pore diffusion characteristics, while fractional distillation and cold distillation use only the vapor pressure difference of the materials.

Cold distillation for separation of the oxygen stable isotope uses the equilibrium vapor pressure differences between isotopic NO (Nitric Oxide) whose boiling point is very low. It is advantageous because its stage separation factor is relatively high (separation factor for O-18, α~1.03) and also it can produce the other isotopes, N-14 and N-15, as byproducts. However, the separation system should be built by the resistive materials due to corrosive nature of NO and also it should be handled carefully due to its toxicity. It is also required to use thermal insulation to operate the system long period since the process requires the cold temperature as low as 77 K. More importantly, it is not economic because the additional material conversion system is necessary to transfer the initial material nitric acid to water which is used in the cyclotron as a target.

Fractional distillation of water, however, is more efficient than cold distillation because capital and operation costs are lower than cold distillation since no heavy thermal insulation is necessary due to its relatively high process temperature (330K). In addition, the product of the process is directly used in a cyclotron to produce the radioisotope F-18. Although fractional distillation has many advantageous merits compared to cold distillation, it is still an expensive process due to its huge distillation towers and long equilibrium time caused by relatively low separation factor (α~1.0037).

On the other hand, membrane distillation as a substitute of the current production process has been explored to apply it to real production system since it is introduced first in U.S. Pat. No. 5,057,225. The separation factor for membrane distillation is much higher, α~1.01~1.04, than fractional distillation while it is competitive to cold distillation, since it uses the equilibrium vapor pressure effect, the same with the other distillation process, as well as differentiated diffusion characteristics of the particles with different masses in the membrane pores.

FIG. 1 shows the various membrane distillation methods currently developed. FIG. 1(a) shows Air Gap Membrane Distillation (AGMD) which constitutes with three parts, membrane upper part for water flow-in (hereafter feed) and flow-out (hereafter product); mid part for the water vapor permeate (hereafter tail); and lower part for cold water flowing. When hot water feed flows through on the membrane, water vapor is produced on the membrane surface based on the water temperature. The concentrations of the oxygen isotopic water molecules in the feed water and the water vapor are different, i.e. the concentration of the heavy molecule $H_2^{18}O$ in liquid water (product) is higher than in the water vapor, and vice versa for $H_2^{18}O$ under the certain temperature condition. In addition to the effect of equilibrium vapor pressure, the tail (membrane permeated water vapor) contains higher concentration of lighter water molecules than in the water vapor on the membrane surface due to its faster diffusion than the heavy molecules in the membrane pores. As a result of combined effects of vapor pressure and diffusion, the product contains heavier water molecules while the tail contains lighter water molecules. To promote the vapor permeation, temperature gradient producing driving force to the membrane interface was applied by a heat exchange plate (or permeation water vapor collector) which is cooled by a flowing cold fluid through the lower part of the permeation cell.

FIG. 1(b) indicates Vacuum Enhanced Membrane Distillation (VEMD). It is distinguished from the other processes by a high permeation flux generated from vacuum pump driven pressure reduction in the lower part of the membrane.

FIG. 1(c) shows the Direct Contact Membrane Distillation (DCMD). It is different from AGMD in the point of view that the tail of DCMD is mixed with a cooling fluid.

FIG. (d) demonstrates Sweep Gas Membrane Distillation (SGMD). In this process, the tail is mixed and collected by a sweep gas flowing though the lower part of the membrane.

Above mentioned membrane distillation processes produce the separation factors in between 1.01~1.04 dependent on the experimental conditions. These factors are much higher than those of fraction distillation which uses the water as a feed same with membrane distillation. Since the concentration of $H_2^{18}O$ produced from a permeation cell is still too low even with the relatively high separation factors, it is required to build a multi-stage membrane distillation system to obtain highly enriched $H_2^{18}O$.

Hence, it is important to iterate the MD processes shown in FIG. 1 and to optimize the operational conditions such as feed flow rate and feed temperature. First of all, the temperatures of the feeds at each stage must be maintained at the same under the given condition. Since the product produced from one stage must be supplied to the next stage as a feed, configuration of the stages should be optimized to push the feed through the stages.

For DCMD and SGMD, construction of a multi-stage system is not proper since the tailed water vapors in these processes are mixed with a cooling fluid or sweep gas. Every stage must have the tailed water vapor separation system to reflux those to the feed of the previous stages in the multi-stage system. This is too costly and complicated to build and operate the system.

It is not also proper for VEMD to construct a multi-stage system since the cold trap to collect the tailed permeated water vapor delivered by a vacuum pump is necessary. Also, the systems to evaporate and to reflux the water vapor are required in VEMD. For AGMD, it is not applicable to a multi-stage system directly since the separation factors are relatively low compared to the other MD processes and the tailed water vapor can not be delivered to the previous stage as a feed with current design and setup.

Therefore, MD is not applicable to construct a multi-stage system to produce highly enriched O-18 water so far.

SUMMARY OF THE INVENTION

The present invention has been made to solve the foregoing problems of the prior art and therefore an aspect of the present invention is to provide an oxygen isotope separation system with multi-stage cells without any addition of complicated constitution and a method producing high separation factors.

According to an aspect of the invention, the invention provides an oxygen isotope separation system including: a number of Air Gap Membrane Distillation (AGMD) permeation cells connected in series to separate a feed into a product and a tail, wherein each of the AGMD cell is connected at a product outlet and at a tail outlet with a reflux pump, whereby the product from (i−1)th cell and the tail from (i+1)th cell are pumped as the feed into ith cell.

Preferably, the AGMD cells produce multi-stage membrane permeation, thereby generating Vacuum Enhanced Membrane Distillation (VEMD) effects.

Preferably, the initial feed for the $1^{st}$ cell is fed by a peristaltic pump from a hot water bath and together with the tail from the second cell.

Preferably, each of the AGMD cells includes a heater installed inside an upper part of the cells to control and maintain water temperature.

Preferably, each of the AGMD cells has a hydrophobic membrane made of one selected from the group consisting of PTFE, PVDF, Psf, and PEI.

According to another aspect of the invention, the invention provides an oxygen isotope separation method including: preparing a number of Air Gap Membrane Distillation (AGMD) cells for separating a feed into a product and a tail to be connected via reflux pumps for supplying the product from (i−1)th cell combined with the tail from the (i+1)th cell into the ith cell; supplying the feed to the first cell; performing membrane distillation of water through the membrane permeation cells; and collecting the product from the last stage.

Preferably, each of the AGMD cells has an inside temperature maintained at a range from 40° C. to 70° C.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 2:
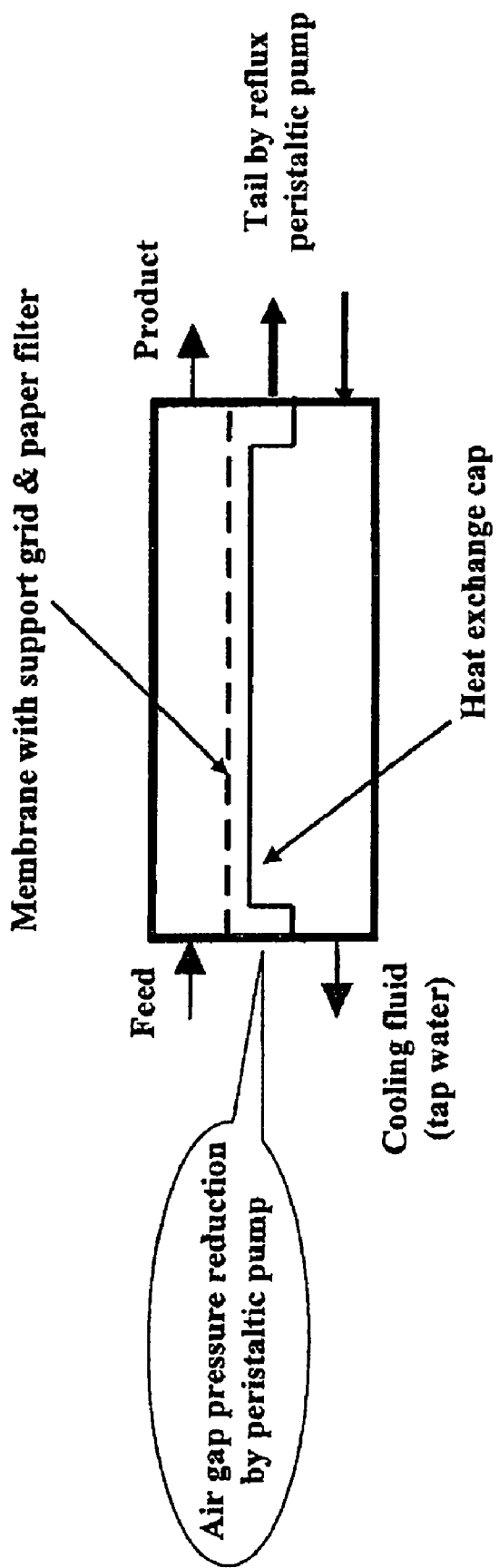
FIG. 2 is a schematic diagram of the membrane distillation apparatus applied in the invention.

FIG. 2 shows the conceptual diagram of the membrane permeation cell applied to this invented membrane distillation system. As it can be shown in FIG. 2, the invented permeation cell includes the membrane upper part for water feed flow-in and product flow-out, membrane and membrane support grid, air gap and water vapor condensing heat exchange cap cooled by cooling fluid (tap water), i.e. it is similar to the AGMD configuration. However, outlet of the mid part of the permeation cell is connected with the peristaltic pump, hereafter reflux pump, to permeate the tailed water vapor effectively by applying pressure reduction in the air gap.

Especially, the reflux pump connected to the tailed water outlet in the mid part of the permeation cell has dual purposes; 1) pressure reduction in the air gap to 20 torrs~25 torrs by removing the air molecules filled in the membrane pores and air gap, i.e. this invention will generate the effects of VEMD using AGMD setup; and 2) delivery of the tailed permeated water to the previous stage combining to the feed supplied to the same stage. These reflux pumps will also help the feeds to all stages to flow to the last stage with enough pressure.

In detail, for the flow of the water vapor in the ideal cylindrical pores, it is reasonable to consider a Knudsen diffusion if mean free path, $\lambda$, of a water molecule is bigger than the pore diameter, while a molecular diffusion is suitable for a smaller $\lambda$ when the air is present in the pores. Hence, the flow of the water vapor under 60° C. through the sub-micro porous membrane is assumed to be the Knudsen flow type in the absence of air in the pores. If air is already filled in the sub-micro pores, however, the flow of the water vapor should be treated as a molecular flow at the same temperature region. It is clear that the membrane permeation flux of the water vapor is strongly dependent on the water temperature, because it determines the pressure of the water vapor in the membrane permeation cell. Isotope separation factor given by Eq (1) for Knudsen diffusion and molecular diffusion is proportional to the ratio of the masses as shown in Eqs (1) and (2). $\alpha_D$ in Eq (2) is for molecular diffusion of the water molecules in the membrane pores filled with the air and $\alpha_K$ in Eq (3) is for Knudsen diffusion of the water molecules in the membrane pores where no air presents.

$$separation factor \alpha = \frac{\left(\frac{^{18}O}{^{16}O}\right)_{product}}{\left(\frac{^{18}O}{^{16}O}\right)_{tail}} \quad \text{Equation 1}$$

-continued $$\alpha_D \sim \sqrt{\frac{M_1(M_2+M_0)}{M_2(M_1+M_0)}}$$ Equation 2

$$\alpha_K \sim \sqrt{\frac{M_2}{M_1}}$$ Equation 3

Here, $M_o$ is the mass of the air, $M_1$ is the mass of $H_2^{16}O$, and $M_2$ is the mass of $H_2^{18}O$. Table 1 shows the values proportional to the separation factors of the isotopes O-16, O-18, H, and D for diffusion in the ideal cylindrical membrane pores. Since the shape of the pores in the hydrophobic membrane, in reality, is not the ideal cylinder, but rather crooked with the tortuosity factor (length of the pore/thickness of the membrane) of two, the separation factors obtained from the experiments may be lower than those values. However, it is clearly assumed that the former may indicate the particle diffusion for AGMD and the latter for VEMD. The present invention will produce the results that can be obtained from VEMD using AGMD setup combined with the peristaltic pumps.

TABLE 1

|  | $H_2O/HDO$ | $H_2^{16}O/H_2^{18}O$ |
|---|---|---|
| Knudsen Diffusion ($\alpha_K$) | 1.027 | 1.0541 |
| Molecular Diffusion ($\alpha_D$) | 1.0166 | 1.0323 |

In addition to increase of isotope selectivity and permeation flux, the invented method hereafter pressure-driven AGMD can effectively collect the tailed water vapor by condensing on the heat exchange cap cooled by cooling tap water, and reflux to the stage it should be delivered.

Figure 3:
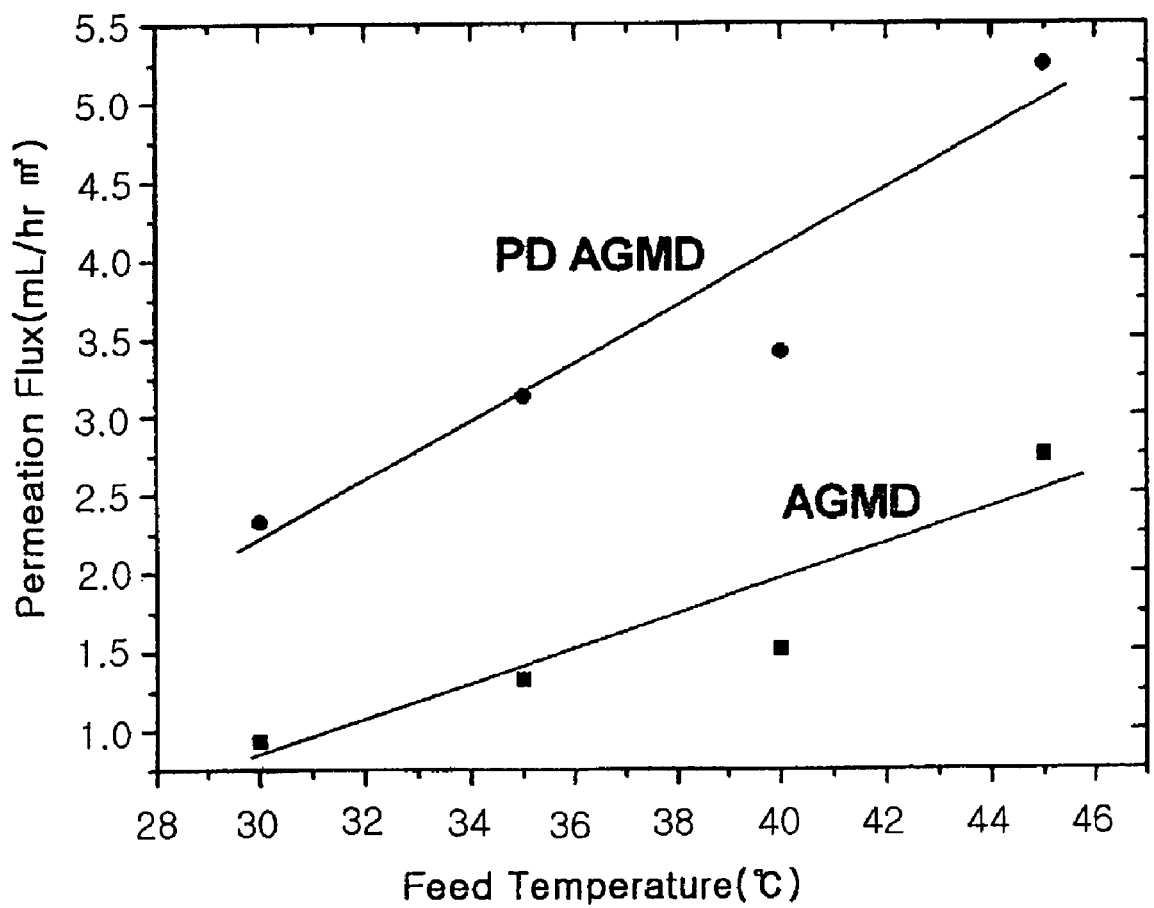
FIG. 3 is a graph for permeation fluxes dependent on the feed temperatures for Pressure-Driven AGMD compared to the conventional AGMD.
Figure 4:
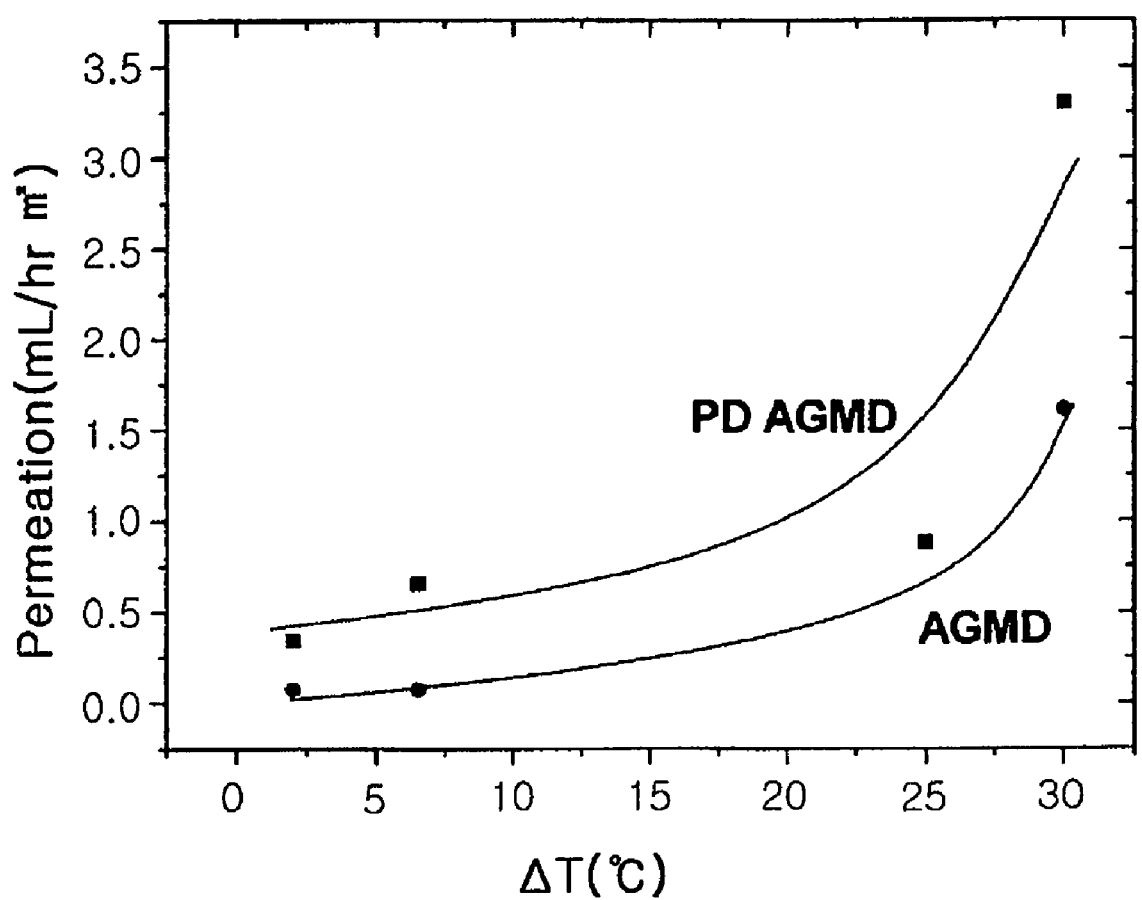
FIG. 4 is a graph for permeation fluxes dependent on the temperature gradient applied on the membrane surfaces for Pressure-Driven AGMD compared to the conventional AGMD.

As a result, permeation fluxes obtained from invented pressure-driven AGMD are as high as twice compared to conventional AGMD under various feed temperatures as shown in FIG. 3. Also, FIG. 4 shows the permeation fluxes dependent on temperature gradient applied to the membrane interface for pressure-driven AGMD are as high as twice compared to conventional AGMD.

Figure 5:
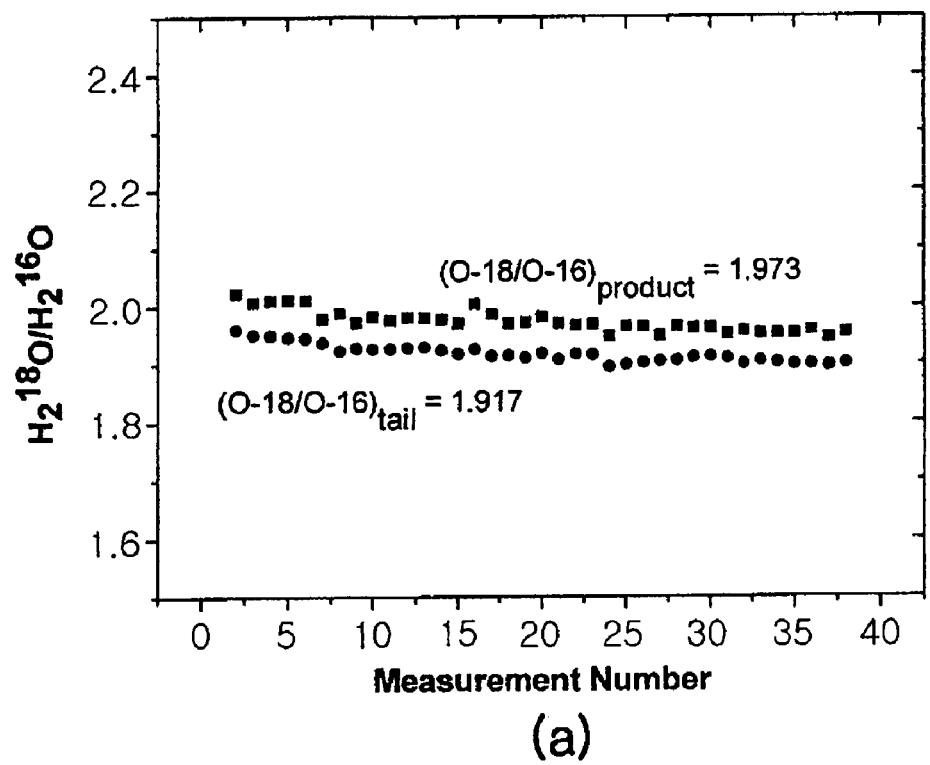
FIG. 5 is a graph for isotope selectivity based on the Pressure-Driven AGMD compared to the conventional AGMD.
Figure 5:
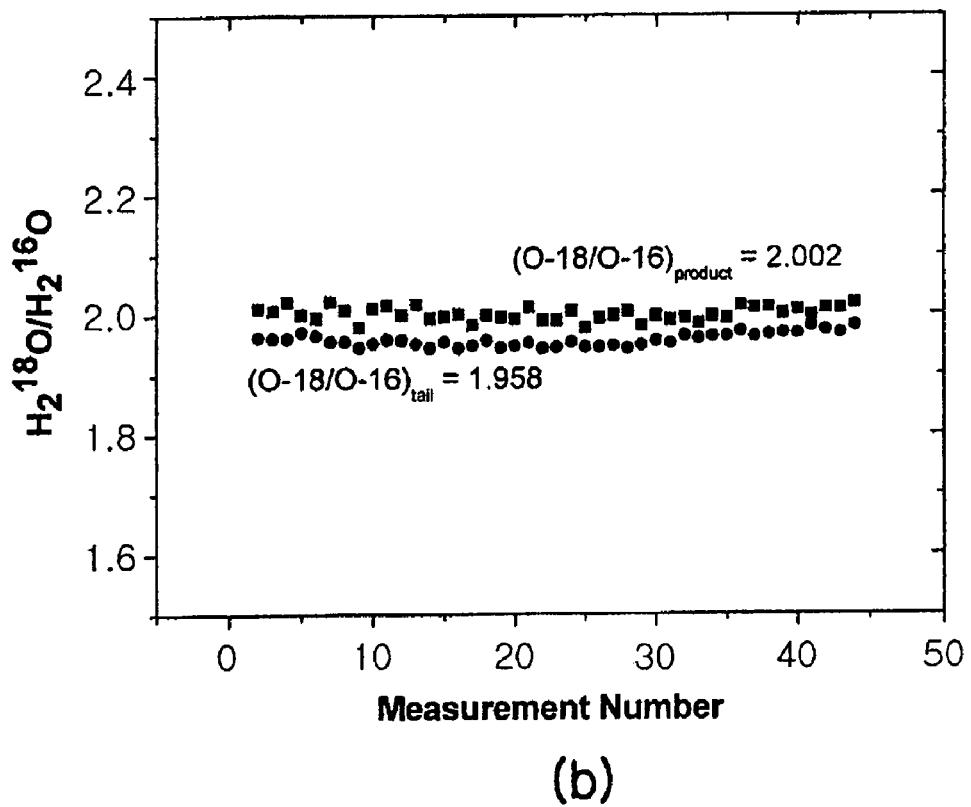

More importantly, FIG. 5(a) and FIG. 5(b) show the isotope selectivity produced from pressure-driven AGMD and conventional AGMD respectively. Isotope selectivity for pressure-driven AGMD is increased about 60% compared to conventional AGMD.

Figure 6:
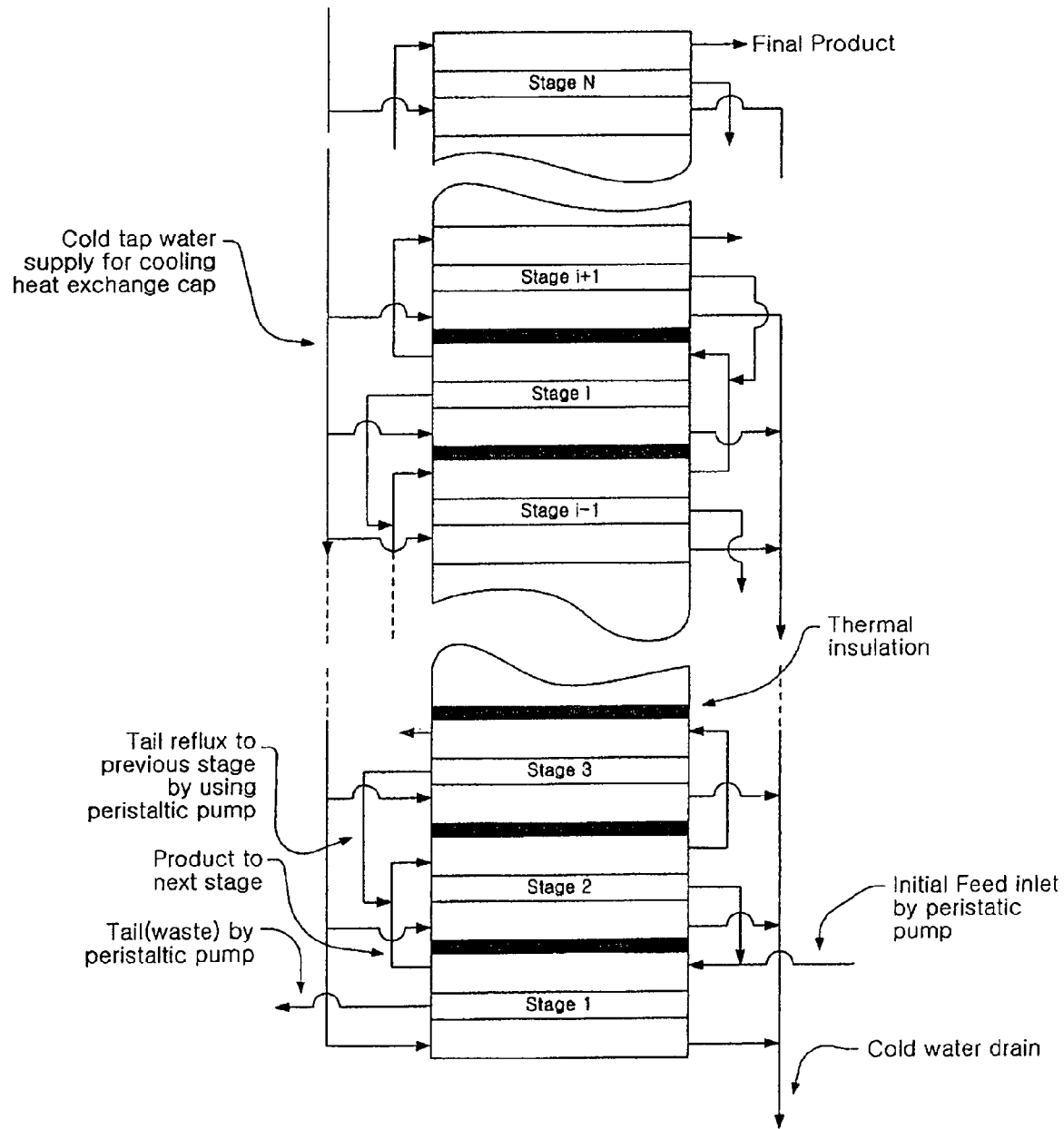
FIG. 6 is a schematic diagram of the multi-stage pressure-driven AGMD system.
Figure 7:
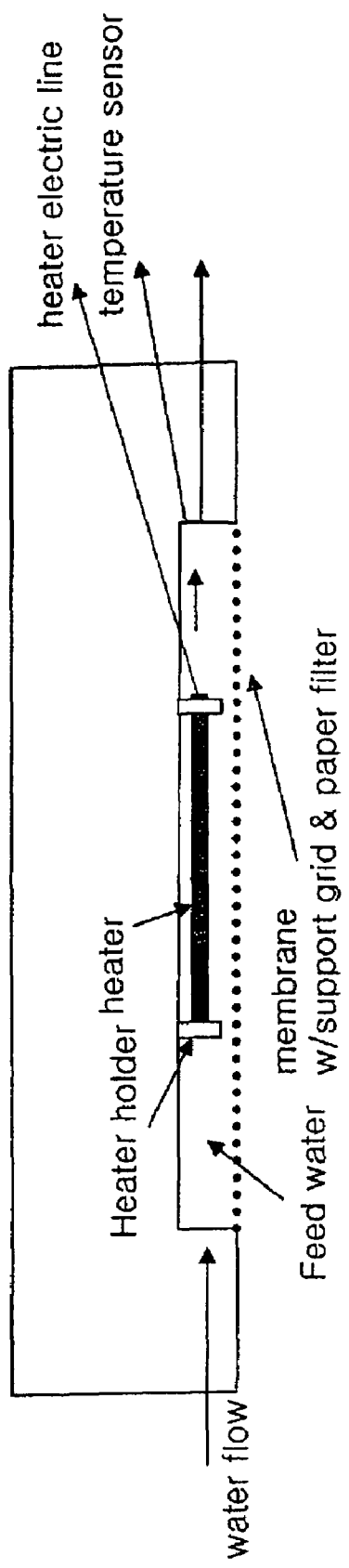
FIG. 7 is a structure of the membrane permeation cell applied to Pressure-Driven AGMD.

Since the degree of isotope separation from a single permeation cell is too low, it is required to construct a multi-stage permeation cell system to enrich $H_2^{18}O$ to usable concentration. FIG. 6 shows the suitable multi-stage scheme for the invented separation process and apparatus. A multi-stage membrane distillation system in this invention should consist of numerous permeation cells connected in series. A stage consists of a single permeation cell in this invention. The feed for ith stage may consist of the product from (i−1)th stage combined with the tail from (i+1)th stage. The product from (i−1)th stage is slightly enriched in O-18 and is supplied to ith stage as a feed for further enrichment. Since the concentration of O-18 in the tail from (i+1)th stage may similar to the concentration in the product from (i−1)th stage, the tail from (i+1)th stage is supplied to the feed for ith stage with the product from (i−1)th stage for enrichment in the stage i. Hence the reflux pump connected to tail outlet of the (i+1)th stage is located just before the joint of the feed line for ith stage feed inlet, i.e. the (i+1)th stage reflux pump supplies enough pressure to flow the ith stage feed together with its tail from the (i+1)th stage. Based on the scheme, the concentration of O-18 in the product of each stage increase as it flows to higher stages, while the concentration of O-18 in the tail of each stage decreases as it flows to the lower stages. The feed of the first stage is delivered by the peristaltic pump, hereafter feed pump, from the hot water bath at a given flow rate. And the product of the last stage is collected as a final product.

The number of the stages necessary for O-18 enrichment depends on the desired concentration in water. In general, the concentration of O-18 used as cyclotron target water should be higher than 90%, which requires 667 stages in present invented process and system based on the result shown in Table 2.

Even though a cooling fluid for control the temperature of the heat exchange cap installed in the mid par of the permeation cell may be supplied by various method, tap water is recommended to be supplied to cool down the heat exchange cap. The tap water can be delivered with the parallel connection to maintain the temperature of the system at the same. The temperatures of the tap water, in general, are about 22° C.~25° C. for summer season and 12° C.~14° C. for winter season. The cooling tap water supply lines are combined after they flow through the system and drained.

Figure 8:
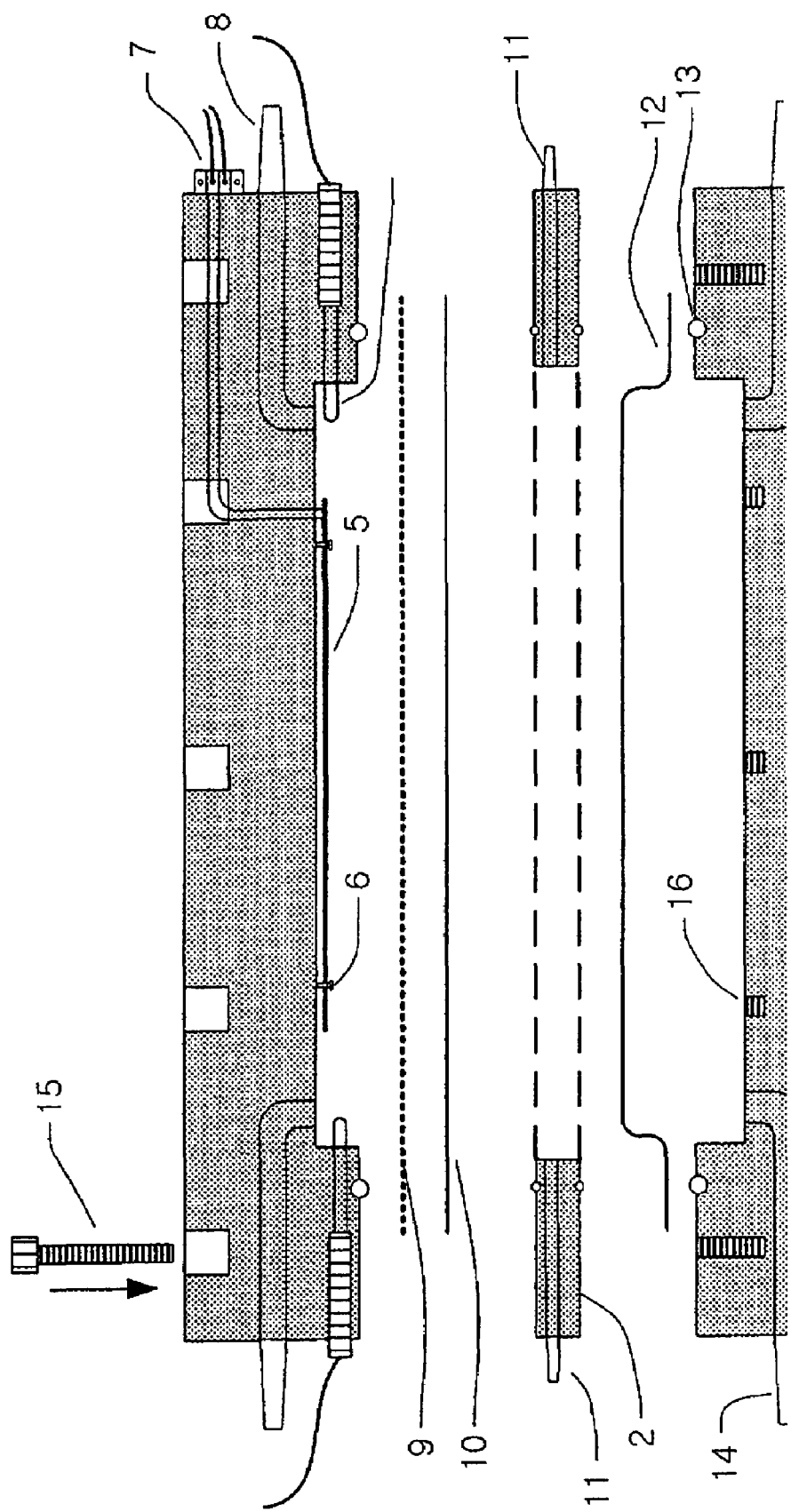
FIG. 8 shows a method for the heater installation inside the membrane permeation cell.

One of the distinctions in the present invention is the immersed heater installed inside the upper part of the membrane permeation cell to control and to maintain the water temperature. Without heat supply inside the cell, the water temperature may decrease as it flows to the outlet of the cell due to heat loss to the cold heat exchange cap. In general, it is possible to operate the system if the work doesn't require numerous permeation cells. If the water temperature of a multi-stage system used for isotope separation decreases as feed water flows through the stages, the process may not performed properly. Hence, it is recommended to install the heater inside the permeation cell. As an immersed heater in water, water-proved resistance heater such as a ceramic heater or a Kapton heater may be suitable for the temperature control of water in the permeation cell. To supply electric power to the heaters, it is recommended to connect the AC or Dc power supply to the heaters. To monitor and control the water temperatures, PID temperature controllers may be connected to the temperature sensors installed in the permeation cell as shown in FIG. 8. A heater may be connected by each power supply. But parallel connections of the several heaters as a set dependent of the capacity of the power supply are recommended to reduce the installment cost for power supply.

Since the membranes used in the present invention may be damaged by the pressure applied by the reflux pumps, the membrane support grid and also paper filter are installed below the membrane to hold it. The membrane support grid should be made of stainless steel mesh with the size of 1 mm×1 mm. These supports, mesh grid and paper filter, don't hinder the diffusion of the water vapor, and rather increase membrane durability or lifetime by holding the pressure applied to the membrane.

It is recommended to use the hydrophobic membrane in this invention to prevent the possible reaction of hydrogen atoms to the hydrophilic membrane materials while it maybe possible to use both the hydrophilic and the hydrophobic membrane. The PTFE hydrophobic membrane is recommended in this invention due to its durability while PVDF, Psf, and PEI are possible to be used.

Hereafter, $H_2^{18}O$ separation method based on the advantageous effects of the invented system is explained in detail.

As an overall scheme, oxygen isotope separation process in this invention includes the step 1) initial feed is supplied to the first stage and each stage consists of a single permeation cell; step 2) membrane distillation is applied to each permeation cells under the certain conditions; step 3) multi-stage membrane distillation system connected with permeation cells in which ith stage feed is supplied from the (i−1)th stage product and from the (i+1)th stage tail; and step 4) final product is collected at the last stage (or permeation cell).

As explained above, since the feed for ith stage fed by the reflux pump for (i+1)th stage may consist of the product from (i−1)th stage combined with the tail from (i+1)th stage, the products are delivered to the next stage and the tails delivered to the previous stage after each stage is in the equilibrium state. The feed of the first stage is the tail from the second stage and the initial feed water contained in the hot bath. And the tail from the first stage is discarded as a waste and the product from the last stage is collected as a final product.

The feed water temperature for each stage should be maintained by aid of heater installed inside the permeation cell. The operational feed temperature between 40° C.~70° C. is suitable for the process; the permeation flux is too low if the operational temperature is lower than 40° C. even with the present invention and the isotope selectivity may be reduced if the operational temperature is higher than 70° C.

Hereafter, this invention will be described in detail in the following description of the preferred embodiment. It is necessary to recognize that this is not to restrict the scopes of the rights in this invention but just to try to embody the invention by presenting the practical examples since scopes of the rights in this invention will be determined by the listed claims and the inferred items from the claims.

EXAMPLE

The diagram in FIG. 8 shows the structure of the membrane permeation cell used in the multi-stage system. Mentioned permeation cell includes membrane cell upper block (1), membrane cell mid center ring block (2), membrane cell lower block (3), PT100 ohm temperature sensor (4), immersed heater (5), heater supporting bolt (6), terminal (7), hot water inlet/outlet (8), hydrophobic membrane (9), membrane supporting grid and paper filter (10), permeated water outlet (one of these is capped) (11), heat exchange stainless steel cap (12), O-rings (13), cold water inlet/outlet (14), squeezing bolts (15) and inserts for squeezing bolts (16).

Shown supporting grid is made of 1 mm×1 mm stainless steel mesh and is used with a paper filter together. Tap water may be used as a cooling fluid and control the temperature of the heat exchange cap at 10° C.~20° C. Multi-cartridge peristaltic pumps are used for flowing the product and the tail at the same time. Table 2 shows an experimental result based on operation of the 40 stages using the invented process and apparatus.

TABLE 2

| Experimental Conditions | Parameters |
|---|---|
| Feed temperature | 40° C. |
| Temperature difference between feed and cooling water | 30° C. |
| Feed flow rate | 5 ml/min |
| Tail(permeate) flow rate | 0.75 ml/min |
| Product(retentate) flow rate | 4.25 ml/min |
| Stage Cut | 85% |
| Stage enrichment factor | 1.0127 |

Enrichment factor shown in Table 2 is given by Eq 4 as follow.

$$enrichment factor \beta = \frac{\left(\frac{^{18}O}{^{16}O}\right)_{product}}{\left(\frac{^{18}O}{^{16}O}\right)_{feed}} \qquad \text{Equation 4}$$

Based on the conditions in Table 2, it took 28 days to obtain 4 kg of product (water containing 0.3% O-18) using 10 kg of initial feed (natural water containing 0.2% O-18). It was demonstrated that the present invention can enrich O-18 isotope without any addition of complexities in the process, As stated, the present invention can offer more efficient membrane distillation process whose stage separation factors and permeation fluxes are higher than those of the conventional AGMD process. And its apparatus can construct more efficient multi-stage system than the other conventional VEMD process.

While the present invention has been shown and described in connection with the exemplary embodiments, it will be apparent to those skilled in the art that modifications and variations can be made without departing from the spirit and scope of the invention as defined by the appended claims.

What is claimed is:

1. An oxygen isotope separation system comprising: a number of Air Gap Membrane Distillation (AGMD) permeation cells connected in series to separate a feed into a product and a tail, wherein each of the AGMD cells is connected at a tail outlet with a reflux pump, whereby the product from (i−1)th cell and the tail from (i+1)th cell are pumped as the feed into ith cell.

2. The system as defined in claim 1, wherein the AGMD cells produce multi-stage membrane permeation, thereby generating Vacuum Enhanced Membrane Distillation (VEMD) effects.

3. The system as defined in claim 1, wherein the initial feed for the $1^{st}$ cell is fed by a pump from a hot water bath and together with the tail from the $2^{nd}$ cell.

4. The system as defined in claim 1, wherein each of the AGMD cells includes a heater installed inside an upper part of the cell to control and maintain water temperature.

5. The system as defined in claim 1, wherein each of the AGMD cells has a hydrophobic membrane made of one selected from the group consisting of PTFE, PVDF, Psf, and PEI.

6. An oxygen isotope separation method comprising: preparing a number of Air Gap Membrane Distillation (AGMD) cells for separating a feed into a product and a tail to be connected via reflux pumps for supplying the product from (i−1)th cell combined with the tail from the (i+1)th cell into the ith cell; supplying the feed to the first cell; performing membrane distillation of water through the membrane permeation cells; and collecting the product from the last cell.

7. The method as defined in claim 6, wherein each of the AGMD permeation cells has an inside temperature maintained at a range from 40° C. to 70° C.

* * * * *

UNITED STATES PATENT AND TRADEMARK OFFICE
CERTIFICATE OF CORRECTION

| | |
|---|---|
| PATENT NO. | : 7,638,059 B2 |
| APPLICATION NO. | : 11/701839 |
| DATED | : December 29, 2009 |
| INVENTOR(S) | : Jae Woo Kim et al. |

Page 1 of 1

Figure 1:
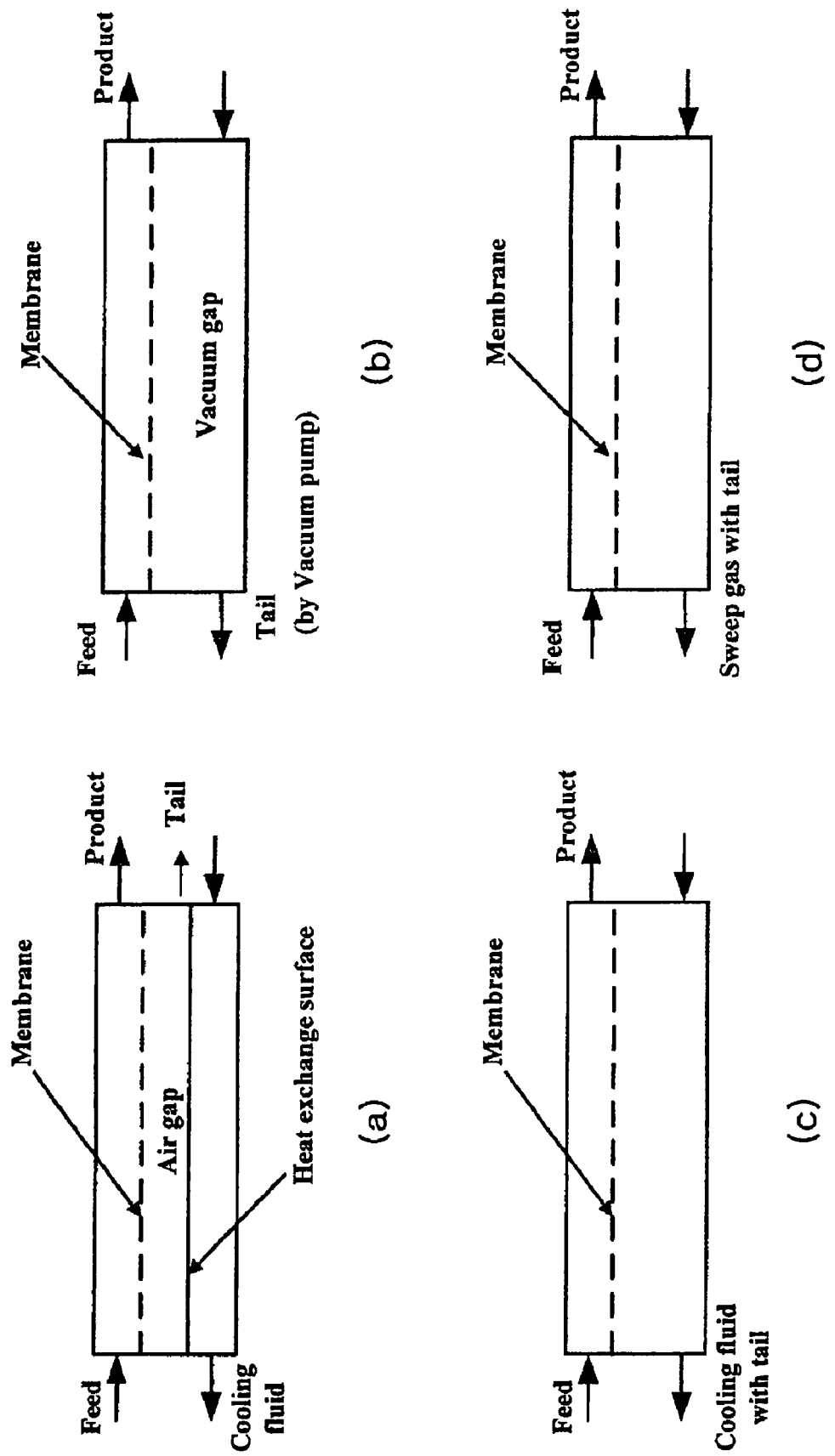
FIG. 1 shows conceptual diagrams of the various membrane distillation processes.

It is certified that error appears in the above-identified patent and that said Letters Patent is hereby corrected as shown below:

IN THE SPECIFICATION:

On Column 2, line 43; Replace "Fig. (d)" with --Fig. 1(d)--.

Signed and Sealed this

Twentieth Day of July, 2010

David J. Kappos
*Director of the United States Patent and Trademark Office*